United States Patent [19]
Macker

[11] 3,833,930
[45] Sept. 3, 1974

[54] INPUT/OUTPUT SYSTEM FOR A MICROPROGRAM DIGITAL COMPUTER

[75] Inventor: John Arthur Macker, Goleta, Calif.

[73] Assignee: Burroughs Corporation, Detroit, Mich.

[22] Filed: Jan. 12, 1973

[21] Appl. No.: 323,107

[52] U.S. Cl. .......... 340/172.5
[51] Int. Cl. .......... G06k 17/00, G06f 13/08
[58] Field of Search .......... 340/172.5

[56] References Cited

UNITED STATES PATENTS

| | | | |
|---|---|---|---|
| 3,297,994 | 1/1967 | Klein | 340/172.5 |
| 3,350,687 | 10/1967 | Gabrielson et al. | 340/172.5 |
| 3,407,387 | 10/1968 | Looschen et al. | 340/172.5 |
| 3,408,632 | 10/1968 | Hauck | 340/172.5 |
| 3,413,612 | 11/1968 | Brooks et al. | 340/172.5 |

*Primary Examiner*—Paul J. Henon
*Assistant Examiner*—Jan E. Rhoads
*Attorney, Agent, or Firm*—Christie, Parker & Hale

[57] ABSTRACT

An input/output sub-system for a digital data processing system having a microprogrammed processor and main memory in which the processor functions as a multiplexor for transferring data between a plurality of peripheral devices and the memory. The I/O controls for the peripheral devices share a common bus to the processor. The controls are slaved to the processor and operate to send or receive information over the common bus only in response to commands from the processor. However, any I/O control unit can signal the processor that it needs service. Each command addressed to one of the I/O control units is followed by status information returned on the bus to the processor by the I/O control. In addition, the status of an I/O control can be tested on special command from the processor. Each I/O control is buffered for storage of a block of data. A reference address pointing to the location of the Input/Output Descriptor in memory being executed by the processor is transferred to the control and stored in the buffer. It is returned to the processor after a Service Request by the control is acknowledged by the processor.

4 Claims, 8 Drawing Figures

PATENTED SEP 3 1974 3,833,930

SHEET 2 OF 4

| COMMAND TYPE | SIGNAL | PHASE | I/O BUS 23 ← | 19 | 15 | | → 0 |
|---|---|---|---|---|---|---|---|
| TRANSFER OUT (XFROT) | CA | A | 0010 | CHANNEL NO. xxxx | DATA | | |
| | RC | B | — | STATUS COUNT | — | | |
| TRANSFER IN (XFRIN) | CA | A | 0100 | CHANNEL NO. xxxx | — | | |
| | RC | B | — | STATUS COUNT | DATA | | |
| TEST STATUS (TSTS) | CA | A | 0001 | CHANNEL NO. xxxx | — | 0001 | |
| | RC | B | — | STATUS COUNT | — | TYPE | P |
| CLEAR & TEST (TXCL) | CA | A | 0001 | CHANNEL NO. xxxx | — | 0011 | |
| | RC | B | — | STATUS COUNT | — | TYPE | P |
| TEST SERVICE REQUEST (TSR) | CA | A | 0001 | — | — | 0110 | |
| | RC | B | — | | MASK | | |
| TERMINATE DATA (TERM) | CA | A | 0001 | CHANNEL NO. xxxx | | 0101 | |
| | RC | B | — | STATUS COUNT | — | | |

FIG. 4

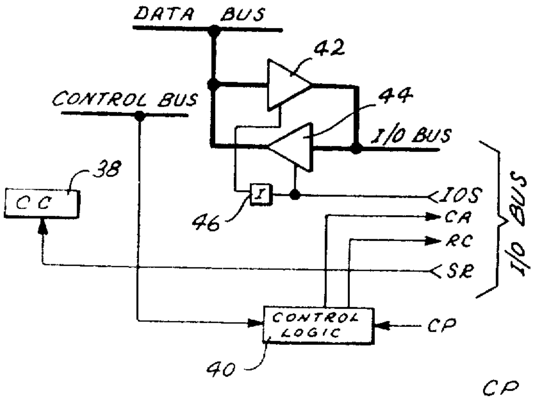

FIG. 6

FIG. 7

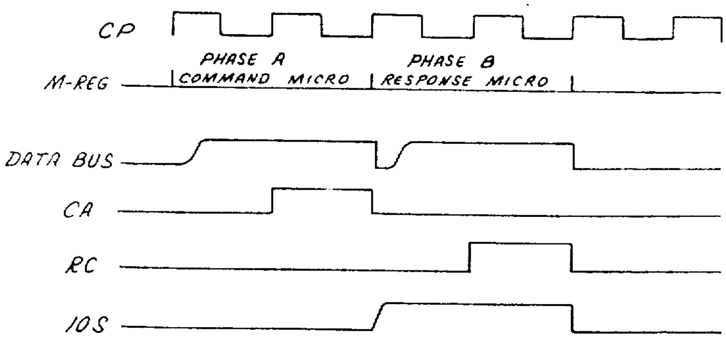

FIG. 5

| | | |
|---|---|---|
| STC -- 0 | RC x CHAF x XFRIN x STC-23 | NOT READY (IDLE) |
| STC -- 1 | READY x STC-0 | READY TO RECEIVE OP-CODE, BYTE 1 |
| STC -- 2 | RC * CHAF * XFROT * STC-01 | READY TO RECEIVE OP-CODE, BYTE 2 |
| STC -- 3 | RC x CHAF x XFROT x STC-02 | READY TO RECEIVE OP-CODE, BYTE 3 |
| STC -- 4 | RC x CHAF x XFROT x STC-03 | READY TO RECEIVE FILE ADDRESS, BYTE 1 |
| STC -- 5 | RC x CHAF x XFROT x STC-04 | READY TO RECEIVE FILE ADDRESS, BYTE 2 |
| STC -- 6 | RC * CHAF x XFROT x STC-05 | READY TO RECEIVE FILE ADDRESS, BYTE 3 |
| STC -- 7 | RC * CHAF x XFROT * READ * STC-06 | |
| STC -- 7 | RC x CHAF x XFROT x STC-17 | READY TO RECEIVE REFERENCE ADD., BYTE 1 |
| STC -- 7 | RC x CHAF x TERM x STC-14 | |
| STC -- 8 | RC x CHAF x XFROT * STC-07 | READY TO RECEIVE REFERENCE ADD., BYTE 2 |
| STC -- 9 | RC x CHAF x XFROT x STC-08 | READY TO RECEIVE REFERENCE ADD., BYTE 3 |
| STC -- 10 | RC x CHAF * XFROT x STC-09 | BUSY (TRANSFER BETWEEN I/O CONTROL & DEVICE) |
| STC -- 11 | READ * BCNT100 * STC-10 | READY TO XMIT REFERENCE ADD., BYTE 1 |
| STC -- 12 | RC * CHAF x XFRIN x STC-11 | READY TO XMIT REFERENCE ADD., BYTE 2 |
| STC -- 13 | RC x CHAF * FRIN x STC-12 | READY TO XMIT REFERENCE ADD., BYTE 3 |
| STC -- 14 | RC x CHAF x XFROT x WRITE x STC-06 | READY TO RECEIVE DATA |
| STC -- 15 | RC x CHAF * XFRIN x STC-13 | READY TO XMIT DATA |
| STC -- 16 | NOT USED | |
| STC -- 17 | RC x CHAF x FROT x BCNT 73 x STC-14 | |
| STC -- 17 | RC x CHAF x XFROT x ETX x STC-14 | READY TO RECEIVE OR XMIT LAST BYTE OF DATA |
| STC -- 17 | * FLAG * STC-15 | |
| STC -- 18 | WRITE * FLAG STC-10 | READY TO XMIT REFERENCE ADDRESS, BYTE 1 |
| STC -- 19 | RC x CHAF x XFRIN x STC-18 | READY TO XMIT REFERENCE ADDRESS, BYTE 2 |
| STC -- 20 | RC x CHAF x XFRIN x STC-19 | READY TO XMIT REFERENCE ADDRESS, BYTE 3 |
| STC -- 21 | RC x CHAF x XFRIN x STC-20 | |
| STC -- 21 | RC x CHAF x TERM x STC-15 | READY TO XMIT RESULT DESCRIPTOR, BYTE 1 |
| STC -- 21 | RC x CHAF x XFRIN x STC-17 | |
| STC -- 21 | RC x CHAF x TERM x READ x STC-17 | |
| STC -- 22 | RC x CHAF x XFRIN x STC-21 | READY TO XMIT RESULT DESCRIPTOR, BYTE 2 |
| STC -- 23 | RC x CHAF x XFRIN x STC-22 | READY TO XMIT RESULT DESCRIPTOR, BYTE 3 |

INPUT/OUTPUT SYSTEM FOR A MICROPROGRAM DIGITAL COMPUTER

FIELD OF THE INVENTION

This invention relates to electronic digital processors, and more particularly, is concerned with an input/output sub-system for a microprogrammed processing system.

BACKGROUND OF THE INVENTION

In the early development of electronic digital data processing systems, transfer of data between peripheral devices, such as magnetic tape, card punch and card readers, printers, key boards and the like, was under the control of the processor. Because input/output operations are relatively slow, the efficiency of the processor was adversely affected by utilizing the processor to handle data transfers between the peripheral devices and the working storage.

In order to free the processor to handle other tasks, input/output controls were developed which could manage the transfer of data between memory and peripheral devices substantially independently of the processor. In such an arrangement the program supplies an instruction, sometimes referred to as an I/O descriptor to an input/output control unit, in response to which the control unit initiates transfer of data between a buffer area in memory defined by the descriptor and a particular peripheral device identified by the descriptor. When the operation is complete, the control unit, returns a Result descriptor to the program to let the program know that the input/output operation has been completed. While such an arrangement frees the processor to do other tasks while the input/output operations are proceeding, it results in a much more complex input/output sub-system.

In copending application Ser. No. 248,500 filed Apr. 28, 1972, now U.S. Pat. No. 3,728,693 and assigned to the same assignee as the present invention, there is described an input/output system in which a plurality of different devices each communicate with a common memory through a port interchange. Each of the devices, referred to as "port devices," have the identical interface with the port interchange. One or more of the port devices is described as being a microprocessor, while another port device might be a multiplexor for operating a plurality of I/O controls, each with its own peripheral device, on a time-sharing basis. An input/output operation is initiated by the multiplexor picking up a reference address from a preassigned location in memory and using that address to fetch an I/O descriptor from memory and utilizing I/O descriptor to initiate an input/output operation between main memory and one of the peripheral devices associated with the multiplexor. While such an arrangement provides a very generalized input/output system, the multiplexor and associated I/O controls are relatively complex circuits.

SUMMARY OF THE INVENTION

The present invention provides a simplified input/output sub-system having many of the features of the system described in the above-identified copending application. However, the use of the multiplexor as a separate port device is obviated by utilizing the microprogram processor itself as a multiplexor for controlling a plurality of I/O control units and their associated peripheral devices to effect transfer of data between main memory and the peripheral devices.

The interface between the processor and the I/O control units is greatly simplified and is designed to avoid excessive processor overhead to handle the interface. The input/output interface includes a bi-directional bus with additional unidirectional control lines. The microprocessor requires only two micro-operators to control all data transfers over the bus, one to send a command and data to the I/O controls, and one to receive data and/or status information from an I/O control. These two micro-operators are always used in pairs, the first of the pair sending the command followed by the second for receiving data over the I/O bus. A command on the I/O bus is always signaled by a Command Active pulse on a first control line from the processor, designated CA, while the data transfer in either direction on the I/O bus is signaled by a Response Complete pulse on a second control line from the processor, designated RC. The complete I/O cycle, therefore, by definition always consists of a CA pulse followed by an RC pulse which initiate and terminate respectively what is referred to as "phase A" and "phase B" of an input/output cycle. Programmatic use of these two micro-operators in pairs permit total control of all the peripheral devices through the I/O interface.

Each control unit connected to the common I/O bus receives each command. The command includes a channel address by which a particular control unit identifies that the command is directed to it. The control units are slaved to the processor and send and receive no data over the common bus except in response to a command from the processor. The control units, however, have buffer storage in which blocks of data are accumulated in transferring data to and from the associate peripheral device, thus freeing the processor during the time transfer of data in or out of a peripheral device is taking place.

One of the features of the present invention is that a reference address pointing to an I/O descriptor in memory, which in turn defines the input/output operation to be performed, is transferred initially, at the start of the I/O operation, to the buffer storage of the particular control unit. Whenever the control unit needs service by the processor, it sends a Service Request signal over a control line to the processor. The reference address is returned to the processor on command by the processor when the request is acknowledged by the program.

Another feature of the invention is that any data put on the common I/O bus to the processor by a control unit during a phase B portion of an I/O cycle includes a status byte. The status byte identifies the state of operation of the control unit. The status byte permits the processor program to recognize key states of the control unit, enabling common program requests to be used for various types of peripheral devices, in contrast to the usual arrangement in which uniquely different programs have been required for each type of peripheral device.

BRIEF DESCRIPTION OF THE DRAWINGS

For a more complete understanding of the invention reference should be made to the accompanying drawings, wherein:

FIG. 4 is a table of I/O commands together with the format of the information on the bus with each command;

FIG. 5 is a table of the standard control states of a control unit;

FIG. 6 is a schematic block diagram of the I/O interface;

FIG. 7 is a timing diagram of the operation of the I/O interface; and

DETAILED DESCRIPTION

Figures 1, 2, 3:
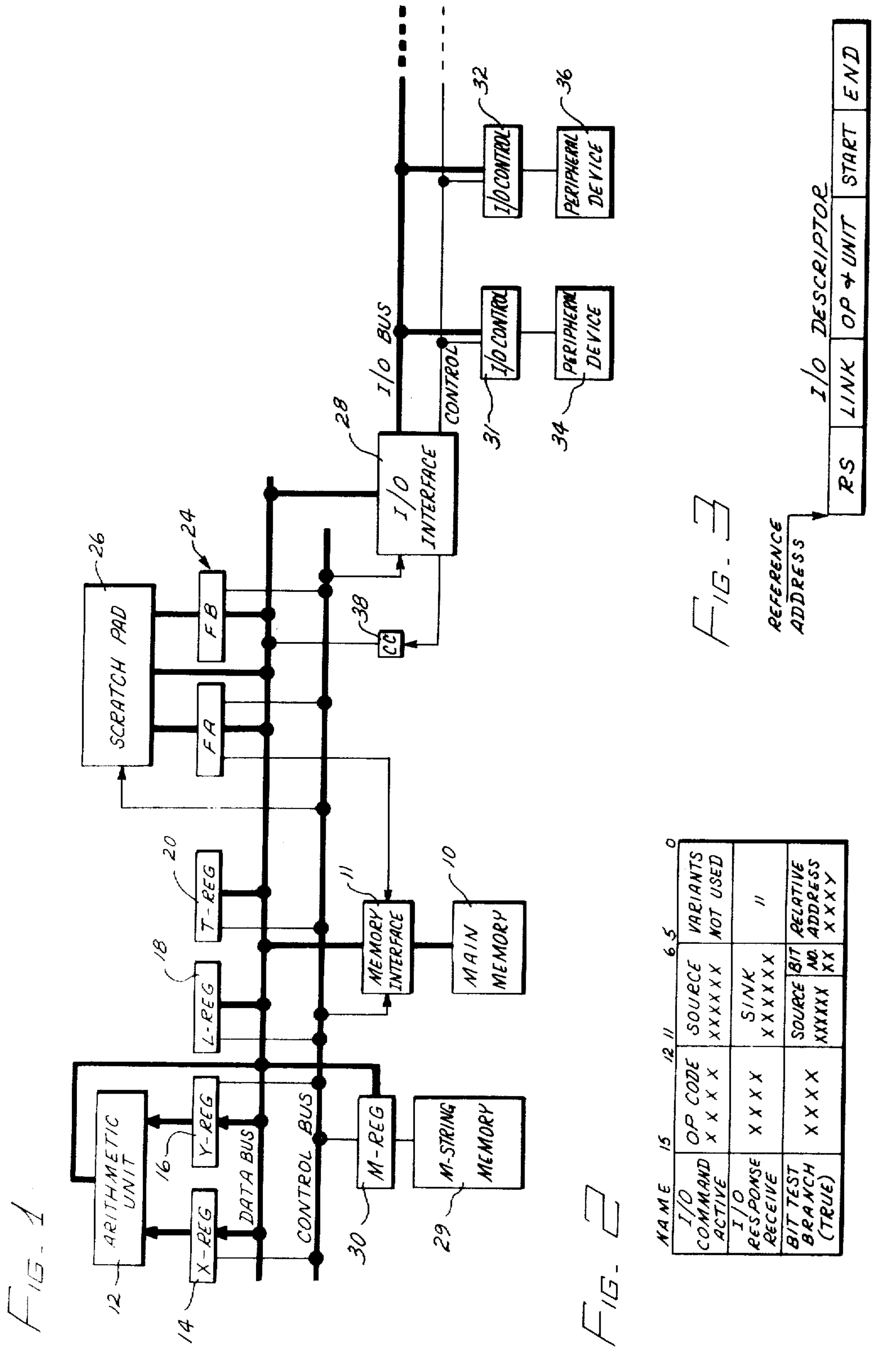
FIG. 1 is a schematic block diagram of a digital processing system of the type incorporating the present invention.
FIG. 2 is a table showing the format of three micro-operators used in controlling the I/O interface.
FIG. 3 illustrates the form of an I/O descriptor.

Referring to FIG. 1 in detail, there is shown in schematic block diagram form a microprogrammed processor of a type described in detail in copending application Ser. No. 157,297 filed June 28, 1971, now U.S. Pat. No. 3,739,352, in the name of Roger E. Packard and assigned to the same assignee as the present invention. The processor includes a data bus by which data is transferred between various registers and main memory. The data bus, for the purpose of illustration, may be designed to transfer up to 24 bits in parallel. The data bus is connected to a main memory 10 through a memory interface 11. The main memory 10 is preferably a free-field memory such as described in detail in copending application Ser. No. 157,307 filed June 28, 1971, now U.S. Pat. No. 3,779,150, and assigned to the same assignee as the present invention. All addressing is by field, in which the bit boundary marking the start of the field and the length of the field are specified by the address. A maximum of 24 bits is transferred in or out of memory in parallel during each memory access cycle.

The data bus is also connected to an X-register 14 and a Y-resister 16 which provide storage for two operands applied to the inputs of an arithmetic and logic network 12, such as described in copending application Ser. No. 157,091 filed June 28, 1971, now U.S. Pat. No. 3,751,651, and assigned to the same assignee as the present invention. Working registers, designated the L-register 18 and P-register 20, are also coupled to the data bus.

The processor also includes a field definition section for storing descriptors defining fields in the main memory 10. The field definition section includes an F-register 24 made up of two 24-bit sections designated FA and FB. Associated with the F-register 24 is a scratchpad memory 26. Descriptors or other 48-bit words may be exchanged between the scratchpad memory 26 and the F-register 24 on command, all in the manner described in application Ser. No. 157,297 filed June 28, 1971, and assigned to the same assignee as the present invention.

Control of the processor is by means of strings of micro-operators which may be either stored in main memory 10 or in an M-string memory 29 and are executed in sequence. The M-string memory 29 is optional but provides increased speed of operation since a main memory access is not required for the fetching of each micro-operator. The micro-operators in the string are transferred out of either main memory or the M-string memory one at a time into an M-register 30. Typically the micro-operators are 16 bits in length, the 16 bits being applied to a control bus for distribution to control logic distributed throughout the processor and associated with the various registers, the arithmetic and logic network 12, the scratchpad memory 26, and the memory interface control 11.

According to the present invention, an arrangement is provided by which the above-described microprocessor is used to control the transfer of data between main memory and a plurality of peripheral devices. The I/O system includes an I/O interface 28 which connects the data bus of the processor to an I/O bus to which a plurality of I/O control units are connected, two of the I/O control units being indicated at 31 and 32. Each I/O control unit controls at least one peripheral device, such as indicated at 34 and 36. Typical of the peripheral devices are printers, card punch units, magnetic tape units, disk file units, punch card readers, and supervisory printers such as teletype machines, and the like. The peripheral devices may function as an input and/or an output device. In addition to providing coupling between the I/O bus and the data bus, the I/O interface 28 also includes a group of control lines, hereinafter described in detail, which go to each of the I/O controls.

The micro-operators for controlling transfer of data between the processor and the I/O control are similar to the Register Move micro-operator described in the above-identified copending application. The micro-operator includes a group of bits which are coded to specify the particular micro-operation (OP code), a group of bits that specify a source, and/or another group of bits that specify a sink from which and/or to which data is transferred by the data bus in response to the OP code.

Referring to FIG. 2, the format of the micro-operators used in connection with the control of input/output operations is shown. The first micro-operator, called the I/O Command Active micro, is identified as such by the four most significant bits. With the micro-operator placed in the M-register 30 for execution, the four most significant bits are applied over the control bus to the I/O interface 28. The next six most significant bits are applied to gating logic associated with one of the registers identified by the coding of the six bits. For example, the arithmetic unit 12, the L-register 18, or the P-register 20 might be designated as a source. The six least significant bits are not used since it is implicit in the command micro that the I/O interface 28 operates as a sink. Thus in response to the Command micro, the contents of the specified register are placed on the data bus and transferred from the data bus by the I/O interface to the I/O bus. At the same time the I/O interface 28, in response to the control bus, generates a Command Active (CA) pulse on a common control line going to each of the I/O control units in the system.

Similarly the I/O Response Receive micro designates a sink register to be coupled to the I/O interface 28 through the data bus. In the presence of the Response micro in the M-register 30, the I/O interface connects the I/O bus to the data bus and generates a Response Complete (RC) pulse on a control line going to each of the I/O control units in the system.

A third micro-operator is also utilized in servicing of the I/O control units by the processor. Whenever an I/O control unit requires service of the processor, it generates a Service Request (SR) signal that is sent to the I/O interface 28. As a result, the I/O interface 28 sets a bit in a control register 38 in the processor. This bit is tested by a micro-operator called a Bit Test Branch micro. Bits 6 to 11 of this micro (see FIG. 2) identify the CC register 38 as a source. Bits 4 and 5 of the Bit Test micro identify which bit in the register is to be tested. The four least significant bits specify a relative address for the purpose of branching to another location in the microprogram string if the specified bit has been turned on. Thus if there is a service request pending, it will be tested during execution of the microprogram string by a Bit Test Branch micro, and if the test is true, the program branches to the start of another microprogram string which is designed to service the input/output subsystem in a manner hereinafter described in more detail.

All input/output operations are programmatically controlled by means of a table of I/O descriptors which are established in main memory. Each I/O descriptor is divided into a number of fields. The first field in the I/O descriptor is called a Result Status (RS) field. This indicates whether the I/O operation is waiting to be executed, is in the process of being executed, or has already been executed by the program. The next field is a Link Address (LINK) field, which points to another I/O descriptor where chaining of I/O operations is desired. The next field, the OP-code field, specified the I/O operation to be performed and the I/O control unit involved. For example, the operation may be a Read operation, a Write operation, or a Test operation. The last two fields of the I/O descriptor specify respectively the Start and End address of a buffer area in main memory to be used in the I/O operation.

To execute an I/O operation, the program generates a reference address which points to a particular I/O descriptor. This reference address could, for example, be the LINK address from a previously executed I/O descriptor. The manner in which I/O descriptors are utilized by a program to control input/output operations is described in more detail, for example, in copending application Ser. No. 248,500 filed Apr. 28, 1972, identified above.

To understand the manner in which a program calling for an input/output operation is executed by the processor, it is necessary to consider how the I/O Command Active and I/O Response Receive micro-operators, described above in connection with FIG. 2, are utilized by the system to operate the input/output sub-system. This in turn requires an understanding of how the I/O interface 28 and the I/O control units 31 and 32 operate.

Referring to FIG. 6, the I/O interface is shown in more detail as including control logic indicated generally at 40. The input to the control logic is derived from the control bus which in turn is controlled by a micro-operator in the M-register 30. The control logic 40, in response to the micro-operator on the control bus and a system clock pulse (CP) generates control signals on the output lines designated CA and RC. A pulse is generated on the CA line in response to a Command micro, while a pulse is generated on the RC line in response to a Response micro. The timing of the signals on the CA and RC control lines is shown in FIG. 7. The micro is in the M-register for two pulse periods. With the Command micro present, the CA line goes true during the second clock interval during which the Command micro is in the M-register. Similarly, the RC control line goes true during the second clock interval in which a Response micro is in the M-register 30. As pointed out above, a Command micro by definition is always followed by a Response micro to define phase A and phase B of a complete I/O cycle.

Again referring to FIG. 6, the data bus of the processor is coupled to the I/O bus bi-directionally by means of a pair of drivers 42 and 44. These drivers are controlled by a single control line IOS connected to each of the I/O control units. When IOS is true, it turns on the driver 44 to transfer information from the I/O bus to the data bus. With the IOS signal not true, the driver 42 is turned on through an inverter 46 to transfer information from the data bus to the I/O bus. The manner in which the IOS signal is generated will be hereinafter explained in connection with the operation of the I/O control unit. However, as seen in FIG. 7, the IOS signal is normally off and is turned on during phase B.

All operations of the I/O control units are initiated in response to a group of commands which are transferred over the I/O bus to the I/O control units in response to a Command micro. A table of these commands is shown in FIG. 4. A Transfer Out command (XFROT) during phase A is transferred as 24 bits over the I/O bus in the format shown in FIG. 4, namely, the four most significant bits are coded 0010. The next four most significant bits identify the number of the channel to which the command is directed and the remaining 16 bits are available for data. As will be hereinafter described in more detail, each I/O control unit includes a status register by which the I/O control is placed in any one of 24 operating states. During phase B the response on the I/O bus identifies the state of the status register of the particular I/O control unit to which the command was directed.

Again referring to FIG. 4, a Transfer In command (XFRIN) during phase A transfers the code 0100 on the four most significant bits of the I/O bus plus the channel number as the next four bits. During phase B the response on the I/O bus includes the status count of the I/O unit plus up to 16 bits of data.

In addition there are three test commands, Test Status (TSTS), Clear and Test Status (TSCL), and Test Service Request (TSR). Each of these is identified by the code 0001 in the four most significant bits plus a variant code in the four least significant bits. Each Test Status command also includes the channel number. In the case of the Test Status and the Clear and Test Status, the response includes the status count as well as identification of the type of peripheral device plus a bit which is on only if the power is on in the I/O control unit and the peripheral device. The Test Service request responds during the B phase with a mask. Each of the I/O units which is requesting service sets its own particular bit in the mask, the position of the bit in the mask identifying the particular channel that is requesting service. Thus any number of channels requesting service may be identified in response to the Test Service command. Finally, a Terminate Data (TERM) command is also provided which also returns a status count during phase B.

To understand how these commands are used to control input/output operations for all types of peripheral devices, the command sequences for controlling communication with a teletypewriter as the peripheral device will be used as an example. This is a standard device by which information can be printed out or information can be entered by a standard keyboard. Thus both input and output operations are involved. Details of the I/O control unit for the teletypewriter, hereinafter referred to as the Supervisory Printout or SPO, is shown in detail in FIG. 8.

Figure 8:
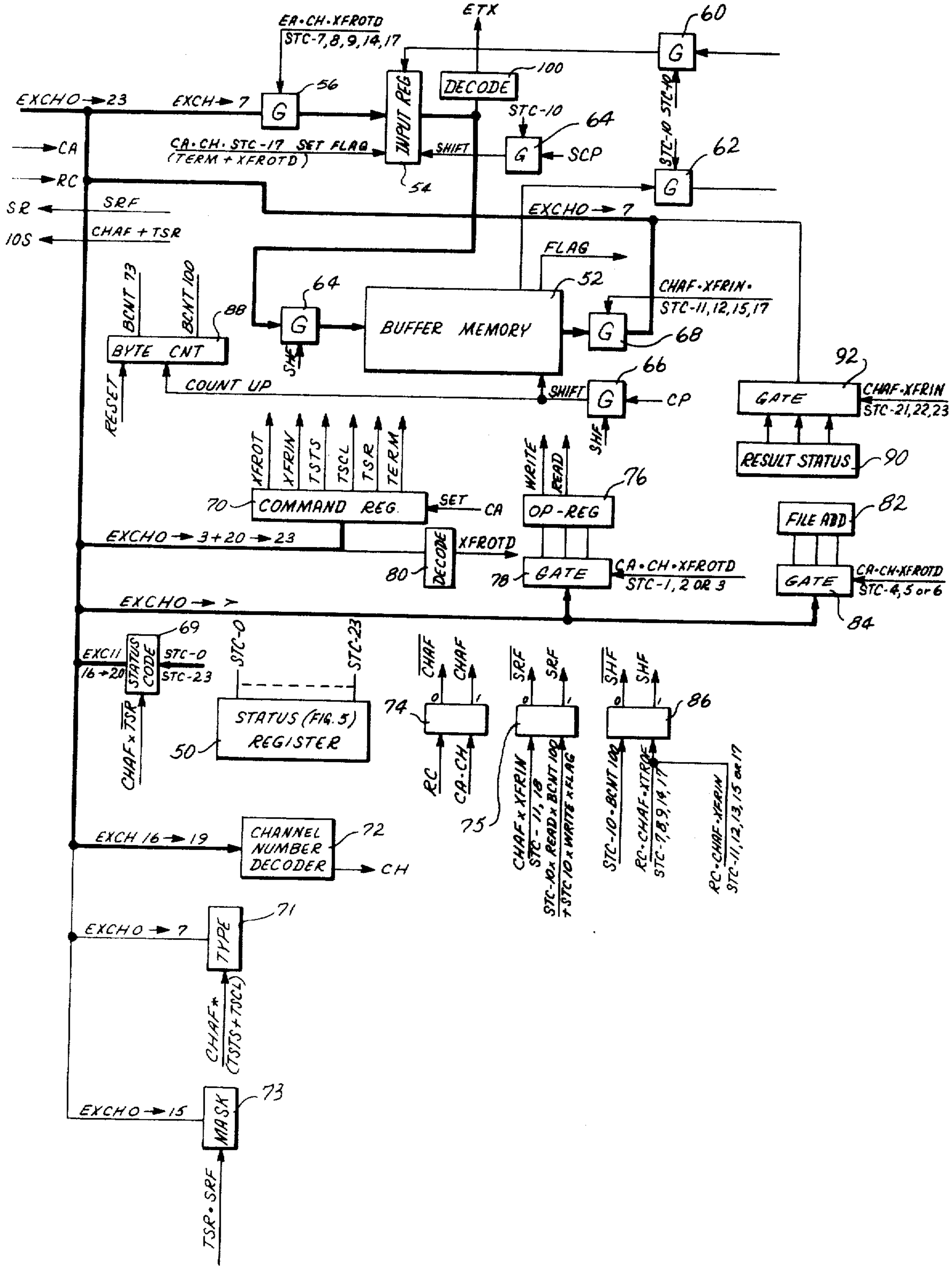
FIG. 8 is a schematic block diagram of a typical I/O control unit.

Referring to FIG. 8 in detail, the SPO control unit includes a status register 50 which can be set to any one of 24 states, designated STC-00 through STC-23. The various states of the status register 50, together with the statement of the conditions which set the status register 50 to each of the status states and the statement of the operational significance of each state, are listed in the table of FIG. 5. Thus the status register 50 is in the STC-0 state when waiting for the peripheral device to be turned on. When the peripheral device is ready, the status register 50 is advanced to the STC-1 state by a READY signal from the SPO. During the STC-1 state, the control unit is ready to receive the first byte of the OP code of an I/O descriptor in response to a Transfer Out command from the processor. When the command is received from the processor, the control unit advances to the STC-2 state in which the control unit is ready to receive the second byte of the OP code. This byte is received by a Transfer Out command from the processor, which command also advances the status register to the STC-3 state. This may be followed by the next three states STC-4 through STC-6 in which three bytes of a file address are transferred to the control unit. Not all controls use or store the file address. The file address normally only applies to a disk file or disk pack to identify the exact location of the data to be transferred. The SPO does not use a file address.

If the OP code indicates that the operation is a Read operation, following the command from the processor which transfers the last address byte, the status counter is advanced to the STC-7 state in which is ready to receive the first reference address byte. This is followed by the STC-8 and STC-9 states in which the remaining two bytes of the reference address are received. The reference address is stored in a buffer memory 52 in the I/O control unit.

The I/O control then enters the STC-10 state in which it performs the operation called for by the OP code. On completion of transfer between the buffer and the peripheral device, the status register is automatically advanced to the STC-11 state in the case of a Read operation, or to the STC-18 state in the case of a Write operation. At the same time the Service Request (SR) signal to the interface is turned on. The processor, after detecting the presence of a service request, then sends a Test Service Request command to all the I/O control units and gets back a mask indicating which control units are requesting service.

Assuming the OP code is a Read operation, the status register 50 is advanced through the STC-11, STC-12, and STC-13 states during which the I/O control is ready to transmit reference address bytes 1, 2, and 3 on receiving Transfer In commands from the processor.

The status register 50 is placed in the STC-15 state from the STC-13 state after the last reference address byte is returned to the processor by a Transfer In command. The I/O control is now ready to transmit one byte of data from the buffer memory 52 to the processor. It remains in this status until all of the characters in the buffer have been transferred into the processor by successive Transfer In commands. This continues until the last byte of data in the buffer signals a flag condition, or until the processor sends a Terminate command. The flag condition causes the status register 50 to be advanced to the STC-17 state, whereas a Terminate command causes the status register to return to the STC-7 state.

The STC-17 state places the I/O control in condition to receive or transmit the last byte of data over the I/O bus. If a Transfer Out command is received during a Write operation, the I/O control is reset to the STC-7 state so that the buffer can be loaded with the reference address following the data. If a Transfer In command is received during a Read operation, the status register 50 is advanced to the STC-21 state. Also, if a Terminate command is received during a Read operation, the status register is set to the STC-21 state. A Transfer In command then causes the first byte of a Result Status word in a Result Status register 90 to be transferred to the processor, advancing the status register 50 to the STC-22 state. Another Transfer In command advances the status register to the STC-23 and causes a second byte of the Result Status word to be transmitted to the processor. During the STC-23 state, a Transfer In command causes the third byte of the Result Status word to be transferred to the processor and causes the status register 50 to be reset to STC-0.

Assuming that the OP code and file addresses have been received by the I/O control unit from the processor, if the OP code calls for a Write operation, instead of advancing from the STC-6 state to the STC-7 state, the status register 50 goes directly into the STC-14 state in which it is ready to receive data into the buffer from the processor.

The status register 50 is set to the STC-14 state from the STC-6 state in response to the Transfer Out command which transfers the last file address byte. In the STC-14 state, the control unit is ready to receive one byte of data. The status register 50 remains in this state while successive Transfer Out commands from the processor cause the buffer memory 52 to be loaded with data bytes. Data bytes continue to be loaded in the buffer memory during the STC-14 state until either an ETX character is received, a Terminate command is received, or the number of bytes reaches a predetermined number. In either case, the status register is set to the STC-17 state. The processor may also send a Terminate (TERM) command in which case the status register is reset to the STC-7 state.

After the data has been transferred from the buffer into the peripheral device during a Write operation, the status register 50, as pointed out above, advances from the STC-10 state to the STC-18 state in which the I/O control unit is ready to transmit the first byte of the reference address from the buffer memory 52 back to the processor. Three successive Transfer In commands transfer the three bytes of the reference address from the buffer back to the processor over the I/O bus. At the same time, the status register 50 is advanced to STC-19, STC-20, and finally to STC-21, in which the I/O control is ready to transmit the Result descriptor, as described above. The Write operation is otherwise the same as the Read operation.

Referring to FIG. 8, the details of the I/O control unit are shown. In addition to the status register 50 and the buffer memory 52, the I/O control unit includes an input register 54 which receives bits in parallel from the I/O bus through a gate 56. The input register is also arranged to receive bits serially from the peripheral device through a gate 60. The input register 54 in transferring information serially may be operated as a shift register by means of slow clock pulses through a gate 64, the slow clock pulses corresponding in frequency to the serial bit rate of the peripheral device, so that serially-coded characters from the peripheral device are assembled. A single byte is transferred from the input register 54 into the buffer memory 52 through a gate 64. The buffer memory 52 is operated as a shift register by means of shift pulses applied through a gate 66. Bytes are shifted out of the buffer memory 52 to the I/O bus through a gate 68. While not specifically shown, it will be understood that the I/O control unit may include a translator for converting between the internal code of the processing system and the code of the peripheral device. For example, the internal code of the processor might be an 8-bit EBCDIC code, whereas the characters generated within the peripheral device might be in a 7-bit ASCII code.

As indicated above, the four least significant bits and the four most significant bits of each command received from the processor over the I/O bus define the command. These bits are applied to a command register 70 which is set by the CA pulse from the I/O interchange. The command register has six outputs corresponding to the six possible commands listed in FIG. 4. In addition to the data and the command bits, each command except the Test Service Request command, includes four bits which define the channel number. These are applied to a channel number decoder, and if the channel number corresponds to the number of the particular I/O control, the channel number decoder 72 provides a signal on an output line CH. The output of the channel number decoder 72 is used to turn on a Channel Active control flip-flop (CHAF) 74 with the GA pulse.

After a command is received, a response is returned to the processor over the I/O bus during phase B. For a Transfer In command, data is applied to exchange lines 0–7 of the I/O bus by means of gates 68 from the buffer memory 52. The gate 68 is opened when the control flip-flop 74 has been turned on during phase A, the Transfer In command is present in the command register 70, and the status register 50 is in one of the states STC-11, 12, 15 or 17, which are the states in which the I/O control is ready to transmit data to the processor. In addition, for all commands except the Test Service Request (TSR) command, the status count of the status register 50 is applied to exchange lines 16 through 20 of the I/O bus. To this end, a status code circuit 69 senses which of the status lines from the register 50 is true and gates these onto the I/O bus whenever the channel active control flip-flop 74 is on and the TSR line from the command register 70 is off.

In addition to the status count, the Test Status command and the Clear and Test command cause coded information as to the type of peripheral device to be put on the exchange lines 0–7 of the I/O bus. The type code is applied by a type coding circuit 71 which is activated whenever the channel active flip-flop 74 is on and either the TSTS or TSCL lines from the command register 70 are true.

Finally, during phase B, in response to a Test Service Request command, the mask is applied to the exchange lines 0–15 of the I/O bus by a mask circuit 73. The mask identifies the particular I/O control unit which is requesting service. A number of I/O control units can respond at the same time to a Test Service Request command. If a particular I/O control unit is actually requesting service as indicated by a service request control flip-flop (SRF) 75, it will respond affirmatively to the TSR command. The control flip-flop 75 is turned on during the STC-10 state of the status register 50 if the OP register 76 calls for a Read operation and a byte counter 88 has activated a BCNT-100 line, indicating that the buffer memory 52 is full. Control flip-flop 75 is also turned on during the STC-10 state if the OP register 76 calls for a Write operation and a flag is on indicating that the last byte in the buffer memory 52 is being transferred to the peripheral device.

The service Request signal on the line SR may be from any I/O control unit and is controlled by the flip-flop 75 in each control unit to signal the I/O exchange whenever a particular I/O control is requesting service.

The IOS signal to the I/O exchange is true whenever the control flip-flop 74 is turned on. The IOS signal signals the interchange to turn on the driver 44 so as to transfer signals from the I/O bus onto the data bus of the processor. The IOS signal is also turned on by the Test Service Request command, so that the mask information can be received by the processor over the I/O bus from all of the I/O controls simultaneously. The Test Service Request command can interrogate all of the I/O control units at the same time.

The OP register 76 receives three bytes comprising the OP code from the I/O bus through a gating circuit 78 in the STC-1 state, STC-2 state, and STC-3 state of the status register 50, the transfer taking place in response to the CA pulse in the I/O control in which the output CH of the channel number decoder 72 is true and in response to a Transfer Out command from the processor. This command is sensed by a decoder 80 in response to the highest order bits received on the I/O bus during phase A. The output of the OP register 76 may activate a Write line or a Read line, depending upon which operation is called for by the I/O descriptor being executed by the program. The status register 50, as indicated in FIG. 5, is advanced through states STC-1, 2, and 3, with each RC pulse received, following the receipt of an XFROT command by the I/O control unit.

Three bytes of file address are then stored in a file address register 82 through a gating circuit 84 by successive Transfer Out commands which advance the status register 50 through the STC-4, 5, and 6 states.

Assuming for the moment that the OP register 76 indicates that a Read operation is to take place wherein data is to be transferred from the peripheral device to the processor over the I/O bus, three more Transfer Out commands are received which advance the status register through the STC-7, 8, and 9 states. The next three Transfer Out commands advance the status register through the STC-7, 8, and 9 states during which three bytes constituting the reference address are received over the I/O bus and transferred through the input register 54 into the buffer memory 52. A SHIFT control flip-flop (SHF) 86 is set to 1 in response to the RC pulse following each Transfer Out command during the STC-7, 8, and 9 states. With the control flip-flop 86 on, each byte, as it is received, is transferred from the input register 54 through the gate 64 to the input of the buffer memory 52 and then shifted into the buffer memory by a clock pulse through the gate 66. All bytes in the buffer are shifted to the right at the same time. As each byte is shifted into the buffer memory 52, the byte counter 88 is counted up 1 by the output of the gate 66. As noted in FIG. 5, the status register 50 is advanced to the STC-10 state with the Transfer Out command that transfers the last byte of the reference address into the buffer memory during the STC-9 state.

During the STC-10 state of the status register 50, for a Read operation data is transferred from the peripheral device serially into the input register 54 and as each full byte is assembled in the input register, it is shifted through the gate 64 into the buffer memory 52. The manner in which bytes are assembled serially in the input register and then transferred in parallel into the buffer memory 50 is a conventional operation and a detailed description is not necessary to the understanding or practicing of the present invention.

When the buffer memory 52 is full, as indicated by the byte counter 88 having counted up to the maximum capacity of 100 bytes, the status register 50 is advanced to the STC-11 state, as indicated in FIG. 5. At this time, the three bytes of reference address are in the right-hand positions of the buffer memory 52 in position to be the first bytes to be transferred to the processor during subsequent Transfer In (XFRIN) commands.

The three Transfer In commands from the processor advance the status register 50 from the STC-11 state through the STC-12 and STC-13 states and from the STC-13 state to the STC-15 state. During the STC-11, 12, and 13 states, the three bytes of reference address are shifted out of the buffer memory 52 by means of gate 68 onto the I/O bus. At the same time the SHF control flip-flop 86 is set to 1 to cause a shifting of the buffer memory 52 and counting up of the byte counter 88.

As shown in FIG. 5, with the status register 52 in the STC-15 state, successive Transfer In (XFRIN) commands transfer successive bytes of data from the buffer memory 52 onto the I/O exchange bus back to the processor. The status register 50 remains in the STC-15 state until a flag signal is provided by the buffer memory 52 indicating that the last data byte is in the right-hand most position of the buffer memory 52 ready to be transferred out onto the I/O bus. As indicated in FIG. 5, the flag signal causes the status register 50 to advance to the STC-17 state during which the last byte of data is transferred into the processor in response to the last Transfer In command. Then the status register 50 is set to the STC-21 state from the STC-17 state.

During the STC-21 state, a Transfer In command is received from the processor which causes the first byte of the contents of a Result Status register 90 to be transferred by means of a gating circuit 92 onto the I/O bus. The remaining two bytes of the Result Status register are transferred during STC-22 and 23. The status register 50 is then returned to the STC-0 state.

It should be noted that the processor may terminate the transfer of data at any time during the Read operation. As indicated in FIG. 5, if while operating in the STC-15 or STC-17 states, the I/O control receives a Terminate command, the status register 50 is immediately advanced to the STC-21 state by the RC pulse during phase B.

The operation of the I/O control in executing a Write operation in which data is transferred from the processor into the peripheral device involves a different sequence of the status register 50, as described above in connection with FIG. 5. Again, operation is controlled by a combination of the state of the status register 50 and the command received from the processor. The OP register 76 is first loaded by the processor by Transfer Out commands. This is followed by the file address, if any, and the status register 50 advances through to the STC-6 state. Assuming the OP register indicates a Write operation, the status register jumps to the STC-14 state in which the buffer memory 52 is loaded with data bytes from the processor by a series of Transfer Out commands. During the STC-14 state, the gate 56 gates in a byte of data to the input register 54. The shift control flip-flop 86 is also turned on, causing the bytes to be shifted through the gate 64 into the buffer memory 52 and the byte counter 88 to be counted up. The status register 50 remains in the STC-14 state until either the byte counter 88 reaches a predetermined count condition, for example 73, an ETX character is received in the input register from the processor, or a Terminate command is received. The ETX character is sensed by a decode circuit 100 connected to the output of the input register 54. The presence of the predetermined byte count or the ETX character causes the status register to be placed in the STC-17 state in which the last byte of data is received. A flag is set in the input register 54 during the STC-17 state to flag the last character transferred into the buffer memory system 52. The status register is set to the STC-7 state either by a Terminate command during the STC-14 state, or by the Transfer Out command during the STC-17 state.

With the status register 50 returned to the STC-7 state during the Write operation, the three bytes of the reference address are then inserted into the buffer memory 52 by successive Transfer Out commands. At the same time, the sequence counter is advanced through states 7, 8, and 9 into the STC-10 state.

During the STC-10 state, data is transferred out of the buffer memory 52 serially by bit through a gate 62 to the peripheral device after the buffer memory 52 has first been right-justified. The operation of loading the peripheral device with data from a peripheral control unit is performed in conventional manner and therefore a detailed description is not necessary to an understanding or practicing of the present invention.

The status register 50 stays in the STC-10 state during a Write operation until the flag in the last character of the buffer memory 52 is detected, signaling that the last byte is being transferred to the peripheral device. As shown by FIG. 5, this condition causes the status register 50 to be set to the STC-18 state in which the I/O control is ready to transmit the first byte of the reference address in the buffer memory 52 back to the processor. Three successive Transfer In commands cause the three bytes of the reference address to be returned to the processor and the status register 50 to be advanced to the STC-20 state in which the I/O control is ready to transmit the first byte of the Result descriptor from the Result Status register 90 back to the processor, in the manner already described above.

From the above description it is believed that the operation of the I/O sub-system is evident. The operation of the I/O controllers is completely under the program software as executed by the processor. The I/O control units only control the transfer of data between a buffer in each control unit and the associated peripheral device. All transfers through the I/O interface are controlled by the processor by means of commands which are sent to the I/O control units from the processor. All actual transfers of information over the I/O bus take place only in response to one of two micro-operators executed by the processor. When an I/O control unit needs service by the processor, the processor must interrogate the I/O control unit by means of a Test Service Request command. This command returns the mask information identifying each of the control units that are requesting service.

To enable the program to keep track of the status of the I/O control units, one of the features of the present invention is that status information is returned to the processor during phase B of every I/O cycle, except for the Test Service Request command. Status information can also be returned to the processor at any time by means of a Test Status command, which command does not in itself affect the status of the I/O control unit. The status can also be tested at the same time that the I/O control unit is cleared back to the STC-1 state by a Clear and Test Status command.

Another feature of the present invention is that the reference address, which points to the I/O descriptor in memory and is used by the program to initiate a particular I/O operation, is stored in the buffer memory 52 of the I/O control while the I/O descriptor operation is being executed by the I/O control unit. This reference address is then returned to the processor when the I/O operation is completed, followed by the Result Status information. In the case of a Write operation, the three bytes of the reference address are transferred into the buffer memory 52 immediately following the transfer of the last byte of data into the buffer memory 52. Thus, as the data is shifted out of the buffer memory 52 into the peripheral device, the three bytes of reference address are shifted to the right in the buffer memory 52 so as to be in position to be shifted out of the buffer memory 52 back to the processor at the end of the I/O operation.

During the Read operation, the reference address bytes are shifted into the buffer memory 52 before data bytes are received from the peripheral device into the buffer memory 52. Thus, the reference address bytes are returned to the processor before the data bytes are shifted out of the buffer memory 52 back to the processor. The return of the reference address to the processor enables the processor to again locate the I/O descriptor in memory in order to obtain the buffer address information from the descriptor. The processor can then transfer data by command from the control unit buffer into the buffer area in main memory to complete a Read operation. The processor can also insert the Result descriptor into the main memory at the reference address location to replace or modify the now executed I/O descriptor.

What is claimed is:

1. A data processing system comprising a memory; a microprogrammed processor including a plurality of registers, a main data bus having a plurality of parallel lines interconnecting the registers with each other and with memory, and control means including a control register for storing a micro-operator and a control bus connected to the control register for controlling transfer of data over said data bus among selected register and memory; an input/output bus having a plurality of parallel lines; a plurality of input/output control units connected to said input/output bus, each control unit being connected to at least one input/output device; and interface means connecting the input/output bus to the data bus, said interface means including means connected to the control bus and responsive to a first predetermined micro-operator in the control register of the processor for coupling a group of data bits in parallel from one of said registers designated by the micro-operator over the data bus to the input/output bus, means responsive to said first micro-operator for applying a first control signal to each of the input/output control units to signal the control units that data is on the input/output bus, means responsive to a second predetermined micro-operator in the control register of the processor for coupling a group of data bits in parallel over the input/output bus to the data bus and to one of said registers designated by the micro-operator, and means responsive to said second micro-operator for applying a second control signal to each of the control units to signal the control units that data is on the data bus; each control unit including a command register, means responsive to said first control signal for loading the command register in the associated control unit with data bits on a first group of the said parallel lines of the input/output bus, address decoding means responsive to said first control signal from the interface means for generating a channel-active signal in the associated control unit when designated by the coded conditions of data bits on a second group of said parallel lines of the input-output bus, a status register having a plurality of states, each state of the status register defining a control state of the control unit, means responsive to said second control signal from the interface means and the channel-active signal when both signals are present in the control unit for applying the state of the status register in coded form onto the input/output bus.

2. Apparatus of claim 1 wherein each input/output control unit further comprises a buffer memory, and means responsive to the simultaneous presence of said first control signal from the interface means, the channel-active signal, and a predetermined condition of the data bits on said first group of lines of the input/output bus for transferring the data bits on a third group of lines of the input/output bus to the buffer memory.

3. Apparatus of claim 1 wherein each input/output control unit further comprises a buffer memory, and means responsive to the presence of said second control signal from the interface means and a first predetermined condition of said command register for transferring a group of data bits from the buffer register to a group of lines of the input/output bus.

4. Apparatus of claim 1 wherein each control unit further includes means for generating a service request signal when service of the unit by the processor is required, and means responsive to a second predetermined condition of said command register and the presence of the service request signal for transferring a bit on a predetermined one of the lines of the input/output bus, each control unit utilizing a different one of said lines.

* * * * *